United States Patent
He et al.

(10) Patent No.: US 11,404,735 B2
(45) Date of Patent: Aug. 2, 2022

(54) IMMERSED HEAT DISSIPATION DEVICE FOR POWER BATTERY

(71) Applicant: SUGON DATAENERGY(BEIJING) CO., LTD, Beijing (CN)

(72) Inventors: Jisheng He, Beijing (CN); Xintao Cui, Beijing (CN); Peng Zhang, Beijing (CN); Bingshuang Li, Beijing (CN); Chen Wang, Beijing (CN); Hongjie Wu, Beijing (CN); Lei Han, Beijing (CN); Yingjun Wu, Beijing (CN); Jiawei Liu, Beijing (CN); Shuai Zhang, Beijing (CN); Zhihong Zhao, Beijing (CN)

(73) Assignee: SUGON DATAENERGY (BEIJING) CO., LTD, Beijing (CN)

( * ) Notice: Subject to any disclaimer, the term of this patent is extended or adjusted under 35 U.S.C. 154(b) by 216 days.

(21) Appl. No.: 16/618,180

(22) PCT Filed: Dec. 26, 2017

(86) PCT No.: PCT/CN2017/118556
§ 371 (c)(1),
(2) Date: Nov. 29, 2019

(87) PCT Pub. No.: WO2019/126996
PCT Pub. Date: Jul. 4, 2019

(65) Prior Publication Data
US 2020/0112073 A1    Apr. 9, 2020

(51) Int. Cl.
*H01M 10/6567* (2014.01)
*H01M 10/613* (2014.01)
*H01M 10/625* (2014.01)
*H01M 10/617* (2014.01)

(52) U.S. Cl.
CPC ..... *H01M 10/6567* (2015.04); *H01M 10/613* (2015.04); *H01M 10/617* (2015.04); *H01M 10/625* (2015.04); *H01M 2220/20* (2013.01)

(58) Field of Classification Search
CPC ........... H01M 10/6567; H01M 10/613; H01M 10/617; H01M 10/625; H01M 2220/20; H01M 50/20; Y02E 60/10
See application file for complete search history.

(56) References Cited

U.S. PATENT DOCUMENTS

| 2013/0263594 A1* | 10/2013 | Hall ................... F01K 25/06 60/615 |
| 2015/0007589 A1* | 1/2015 | Lim .................. H01M 10/6567 62/62 |
| 2015/0188203 A1* | 7/2015 | Enomoto ............ H01M 50/543 429/83 |
| 2015/0211412 A1* | 7/2015 | Presetschnik ............. F01P 3/20 123/41.1 |

FOREIGN PATENT DOCUMENTS

| CN | 201466117 U | * | 5/2010 | ............ H01M 10/00 |
| CN | 104466300 A | | 3/2015 | |
| CN | 106843423 A | | 6/2017 | |

OTHER PUBLICATIONS

International Search Report of PCT Patent Application No. PCT/CN2017/118556 dated Sep. 7, 2018.

* cited by examiner

*Primary Examiner* — Muhammad S Siddiquee

(57) ABSTRACT

The present invention relates to an immersed heat dissipation device for power battery, comprising a battery heat dissipation module, a battery unit, a liquid refrigerant, a main inlet pipe and a main outlet pipe, wherein the battery heat dissipation module is a structure of sealed box that contains the liquid refrigerant, and a plurality of the battery heat dissipation modules are connected to each other and arranged in the heat dissipation device for power battery. The battery can be effectively cooled and the temperature of the battery can be effectively controlled, and ensure a uniform temperature for the battery unit, thereby improving the performance and life of the power battery of new energy vehicle.

8 Claims, 2 Drawing Sheets

IMMERSED HEAT DISSIPATION DEVICE FOR POWER BATTERY

FIELD OF THE APPLICATION

The present invention relates to the technical field of new energy vehicles, in particular, to an immersed heat dissipation device for power battery.

BACKGROUND OF THE APPLICATION

With the increasing environmental problems, power vehicles are developing rapidly. The power battery is a power source in the electric vehicle and is the core component of the entire power vehicle. The power battery generates a large amount of heat during charging and discharging, resulting in an increase in the temperature of the battery pack. The larger the charge and discharge rate of the power battery, the faster the battery temperature rises, and the power battery pack is usually composed of a plurality of battery cells, which causes a large amount of heat accumulation in the battery pack, and the temperature is too high, affecting the performance and life of the power battery, and may cause safety problems such as thermal runaway or even explosion, therefore, research on the heat dissipation of power battery is of great significance. At present, the commonly used thermal management technologies are air-cooling heat management technology and liquid cooling heat management technology. The air-cooling heat management technology means that the cold air flows through the surface of the battery for heat exchange and cooling. The air-cooling mode is divided into natural cooling and forced cooling (using a fan, etc.). This technology uses natural wind or a fan to cool the battery with the evaporator owned by the vehicle itself together. The liquid-cooling thermal management technology uses a water-cooling method for heat exchange of the battery pack. When the battery is subject to the heat exchange, the battery exchanges heat with the coolant in the pipeline.

The existing air-cooling thermal management technology has high requirements on the ambient temperature, and the temperature of the inlet air is difficult to control, which makes the temperature of the battery difficult to control, also, for the temperature of the gas, since the heat transfer coefficient of the air is small, the efficiency of heat dissipation is low, and the unevenness of the air flow may cause uneven distribution in the battery pack and affect the uniformity for the temperature of the power battery. For the existing liquid-cooling thermal management technology, typically a liquid-cooling pipe with various structures is interposed between batteries, or a liquid-cooling plate is added between the surface of the battery and the battery, so that the heat generated during charging and discharging of the battery cannot be directly transferred to the cooling liquid. Therefore, the effects on heat dissipation and cooling of the battery are not ideal.

SUMMARY OF THE APPLICATION

For the drawbacks of the existing art, the present invention provides an immersed heat dissipation device for power battery, which can effectively cool the battery, control the temperature of the battery, and ensure a uniform temperature for the battery unit, thereby improving the performance and life of the power battery of new energy vehicle.

In order to achieve the purpose of the present invention, the technical solution adopted by the present invention is to provide an immersed heat dissipation device for power battery, comprising a battery heat dissipation module, a battery unit, a liquid refrigerant, a main inlet pipe and a main outlet pipe, wherein the battery heat dissipation module is a structure of sealed box that contains the liquid refrigerant, and a plurality of the battery heat dissipation modules are connected to each other and arranged in the heat dissipation device for power battery; each of the battery heat dissipation modules is mounted therein with the battery unit, each of the battery units is immersed in the liquid refrigerant in the battery heat dissipation module, and the liquid refrigerant is branched by the main inlet pipe through the liquid inlet to enter the battery heat dissipation module; the liquid refrigerant exchanges heat with the battery unit at the battery heat dissipation module; the liquid refrigerant after the heat exchange flows into the main outlet pipe through a liquid outlet, and flows out of the heat dissipation device for power battery.

Preferably, the plurality of the battery heat dissipation modules are arranged in a parallel connection manner in the heat dissipation device for power battery.

Preferably, each of the battery heat dissipation modules further comprises an expansion relief valve.

Preferably, each of the battery heat dissipation modules further comprises a temperature detection sensor.

Preferably, the heat dissipation device for power battery further comprises a main communication cable and a main power cable, each of the battery heat dissipation modules has a communication interface connecting the main communication cable, and each of the battery heat dissipation modules has a power interface connecting the main power cable.

Preferably, the liquid refrigerant is electron fluorinating liquid.

Compared with the existing air-cooling and liquid-cooling thermal management technologies, the present invention may make the battery unit work at a lower temperature, and solves the problem of battery heating in the normal driving process and during the fast charging process of the new energy vehicle, and effectively cools the battery, controls the battery temperature, and ensures uniformity for the temperature of the battery unit, thereby improving the performance and life of the power battery of the new energy vehicle.

BRIEF DESCRIPTION OF THE ACCOMPANYING DRAWINGS

DESCRIPTION OF THE REFERENCE NUMERALS

1—main communication cable, 2—main power cable, 31—main inlet pipe inlet, 32—main outlet pipe outlet, 311—main inlet pipe, 312—main outlet pipe, 4—power heat dissipation module, 41—communication interface, 42—power interface, 431—liquid inlet, 432—liquid outlet, 5—battery unit, 6—expansing relief valve, 7—temperature detection sensor.

DETAILED DESCRIPTION OF THE PREFERRED EXAMPLES

To make the purpose, technical solutions and advantages of the present invention clearer, the embodiments of the present invention will be described below in detail in combination with the drawings. It should be noted that, in the case of no conflicts, the embodiments in the present invention and features in the embodiments can be combined mutually and arbitrarily.

Figure 1:
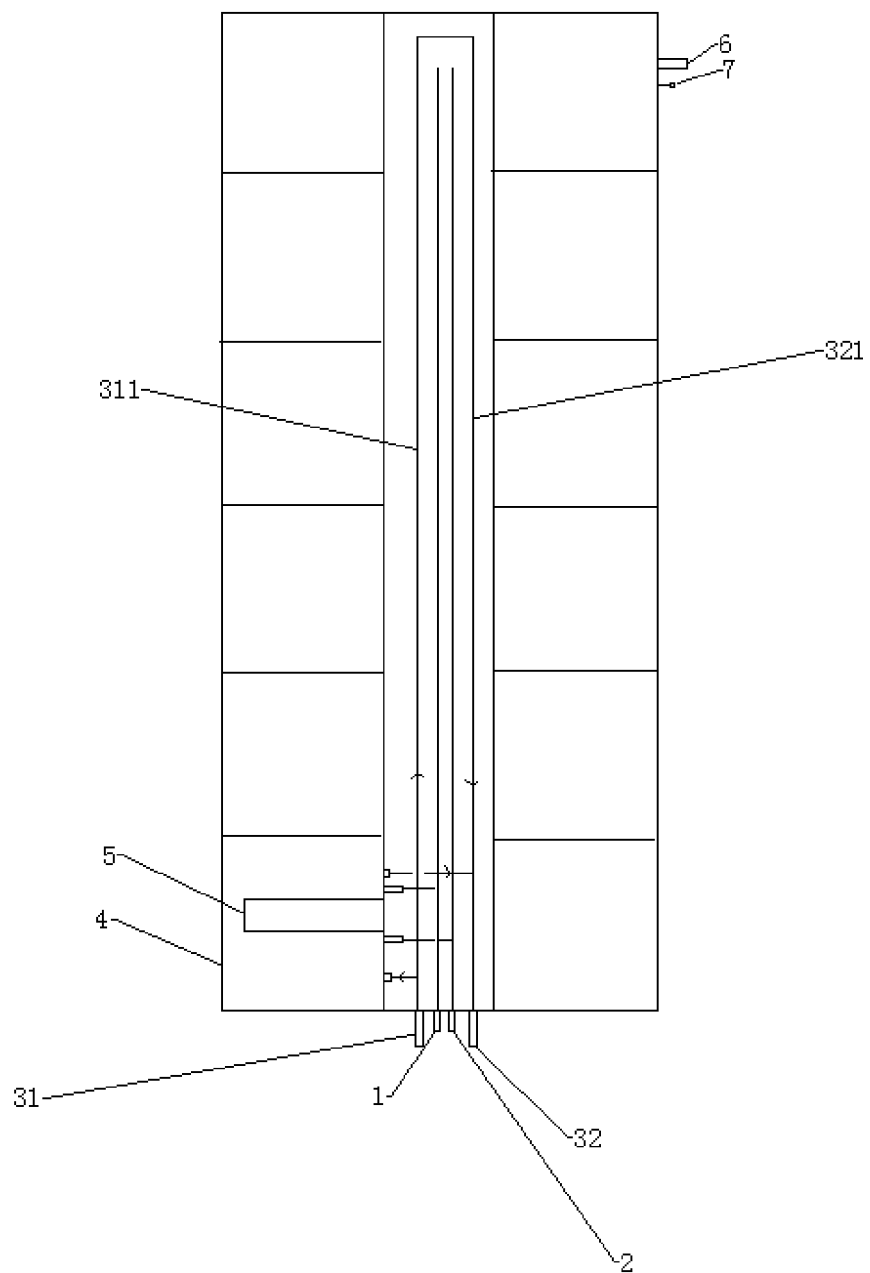
FIG. 1 illustrates a structural block view of a heat dissipation device for power battery according to an embodiment of the present invention.
Figure 2:
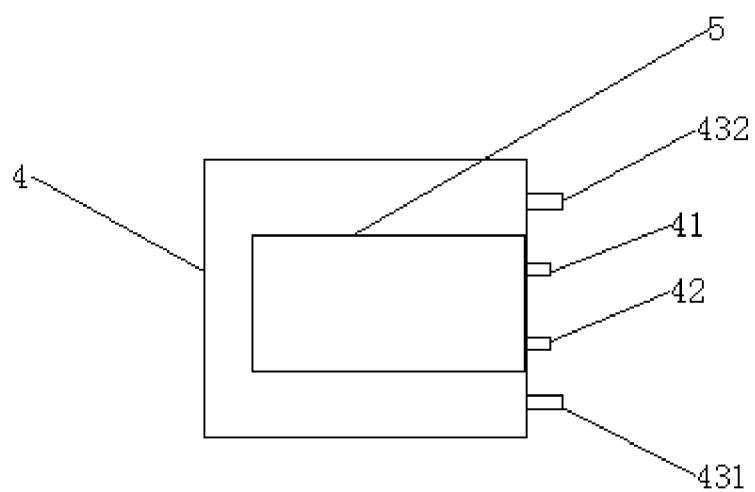
FIG. 2 illustrates a structural view of a battery heat dissipation module according to an embodiment of the present invention.

According to an embodiment of the present invention, as shown in FIGS. 1 to 2, an immersed heat dissipation device for power battery includes a plurality of battery heat dissipation modules 4, a plurality of battery units 5, a liquid refrigerant, a main inlet pipe 311 and a main outlet pipe 312 extending side-by-side with respect to the main inlet pipe 311, wherein the battery heat dissipation module 4 is a structure of sealed box that contains the liquid refrigerant, and a plurality of the battery heat dissipation modules 4 are arranged along two opposite sides of the side-by-side extending main inlet pipe 311 and main outlet pipe 312, and are connected to each other. Each of the battery heat dissipation modules 4 is mounted therein with the battery unit 5, each of the battery units 5 is immersed in the liquid refrigerant in the battery heat dissipation module 4, and the liquid refrigerant is branched by the main inlet pipe 311 through a liquid inlet 431 provided on each of the battery heat dissipation modules 4 to enter the battery heat dissipation modules 4, the liquid inlets 431 are branched out at intervals from the main inlet pipe 311 in two opposite sideward directions that are perpendicular to a longitudinal direction of the main inlet pipe 311; the liquid refrigerant exchanges heat with the battery unit 5 at the battery heat dissipation module 4; the liquid refrigerant after the heat exchange flows into the main outlet pipe 321 through a liquid outlet 432 provided on each of the battery heat dissipation modules 4, and flows out of the heat dissipation device for power battery.

The present invention adopts an immersed heat dissipation technology for power battery, which immerses a battery core of the power battery, i.e., the battery unit 5, into a coolant such that the battery unit 5 is cooled effectively and reliably, wherein the coolant is an insulating liquid refrigerant, such as an electronic fluorinated liquid, and if the insulated liquid refrigerant has a high thermal conductivity sufficient to cope with the heat generated by the battery unit 5, the insulated liquid refrigerant does not need to undergo a phase change. The heat dissipation device for power battery comprises a plurality of battery units 5, and the plurality of battery units 5 are connected in series; the battery unit 5 is entirely immersed in the coolant of the battery heat dissipation module 4 for discharging the heat generated by the battery core-battery unit 5 through the flowing of the coolant. The battery unit 5 is fixed to the box, which is provided respectively with a liquid inlet 431, a liquid outlet 432, a communication interface 41 and a power interface 42, wherein the liquid inlet 431 and the liquid outlet 432 are respectively connected to the main inlet pipe 311 and the main outlet pipe 321 to realize the circulation of the liquid refrigerant into and out, and complete the heat exchange with the battery unit 5. The communication interface 41 and the power interface 42 are respectively connected to the main communication cable 1 and the main power cable 2 for communication of control signals and transmission of power. The main communication cable 1 and the main power cable 2 extend side-by-side with respect to the main inlet pipe 311 and the main outlet pipe 321. The liquid inlet 431, the liquid outlet 432, the communication interface 41, and the power interface 42 are provided on one side of each of the battery heat dissipation modules facing the side-by-side extending main inlet pipe 311, main outlet pipe 321, main communication cable 1, and main power cable 2. The cryogenic coolant from the external coolant circulation system enters the main inlet pipe 311 from the main inlet pipe inlet 31, and enters the box of each of the battery heat dissipation modules 4 through a plurality of liquid inlets 431 that are connected in parallel/series, the coolant flows from one side of the battery heat dissipation module 4 and flows out from the other side of the battery heat dissipation module 4, during this process, the coolant exchanges heat with the battery unit 5 after being in direct contact with the battery unit, and the coolant flows heat from the liquid outlet 432 into the main outlet pipe 321 for being taken away by the main outlet pipe outlet 32.

The structure and working principle for each of the battery heat dissipation modules 4 are the same and the plurality of battery heat dissipation modules 4 are arranged in the entire battery pack through parallel or series connection to form a heat dissipation system for power battery pack.

At each of the battery heat dissipation modules 4, an expansion relief valve 6 and a temperature monitoring sensor 7 for monitoring the coolant pressure and temperature are provided.

While the embodiments of the present invention have been described above, the described embodiments are merely illustrative of the embodiments of the present invention, and are not intended to limit the present invention. Any modification and variation in the form and details of the embodiments may be made by those skilled in the art without departing from the spirit and scope of the invention, and maybe ought to fall within the scope of protection of the present application.

What is claimed is:

1. An immersed heat dissipation device for power battery, comprising a plurality of battery heat dissipation modules, a plurality of battery units, a liquid refrigerant, a main inlet pipe, and a main outlet pipe extending side-by-side with respect to the main inlet pipe, wherein each battery heat dissipation module is a structure of sealed box that contains the liquid refrigerant, and the battery heat dissipation modules are arranged along two opposite sides of the side-by-side extending main inlet pipe and main outlet pipe, and are connected to each other;

each of the battery heat dissipation modules is mounted therein with the battery unit, each of the battery units is immersed in the liquid refrigerant in the battery heat dissipation module, and the liquid refrigerant is branched by the main inlet pipe through a liquid inlet provided on each of the battery heat dissipation modules to enter the battery heat dissipation modules, the liquid inlets are branched out at intervals from the main inlet pipe in two opposite sideward directions that are perpendicular to a longitudinal direction of the main inlet pipe;

the liquid refrigerant exchanges heat with the battery unit at the battery heat dissipation module;

the liquid refrigerant after the heat exchange flows into the main outlet pipe through a liquid outlet provided on each of the battery heat dissipation modules, and flows out of the heat dissipation device for power battery, wherein the heat dissipation device for power battery further comprises a main communication cable and a main power cable, each of the battery heat dissipation modules has a communication interface connecting the main communication cable, and each of the battery heat dissipation modules has a power interface connecting the main power cable, wherein the main communication cable and the main power cable extend side-by-side with respect to the main inlet pipe and the main outlet pipe, and the liquid inlet, the liquid outlet, the communication interface, and the power interface are provided on one side of each of the battery heat dissipation modules facing the side-by-side extending main inlet pipe, main outlet pipe, main communication cable, and main power cable.

2. The immersed heat dissipation device for power battery according to claim 1, wherein the plurality of the battery heat dissipation modules are arranged in a parallel connection manner in the heat dissipation device for power battery.

3. The immersed heat dissipation device for power battery according to claim 1, wherein each of the battery heat dissipation modules further comprises an expansion relief valve.

4. The immersed heat dissipation device for power battery according to claim 1, wherein each of the battery heat dissipation modules further comprises a temperature detection sensor.

5. The immersed heat dissipation device for power battery according to claim 1, wherein the liquid refrigerant is electron fluorinating liquid.

6. The immersed heat dissipation device for power battery according to claim 2, wherein each of the battery heat dissipation modules further comprises an expansion relief valve.

7. The immersed heat dissipation device for power battery according to claim 2, wherein each of the battery heat dissipation modules further comprises a temperature detection sensor.

8. The immersed heat dissipation device for power battery according to claim 2, wherein the liquid refrigerant is electron fluorinating liquid.

* * * * *